US006246555B1

(12) United States Patent
Tham

(10) Patent No.: US 6,246,555 B1
(45) Date of Patent: Jun. 12, 2001

(54) TRANSIENT CURRENT AND VOLTAGE PROTECTION OF A VOLTAGE REGULATOR

(75) Inventor: Khong-Meng Tham, San Diego, CA (US)

(73) Assignee: Prominenet Communications Inc., San Diego, CA (US)

( * ) Notice: Subject to any disclaimer, the term of this patent is extended or adjusted under 35 U.S.C. 154(b) by 0 days.

(21) Appl. No.: 09/655,748

(22) Filed: Sep. 6, 2000

(51) Int. Cl.[7] .......... H02H 9/02

(52) U.S. Cl. .......... 361/18; 323/274; 323/277; 323/908

(58) Field of Search .......... 323/273, 274, 323/277, 908; 361/18

(56) References Cited

U.S. PATENT DOCUMENTS

| | | | | |
|---|---|---|---|---|
| 3,579,039 | * | 5/1971 | Damon | 323/276 |
| 3,924,158 | * | 12/1975 | Farnsworth | 361/18 |
| 4,338,646 | * | 7/1982 | Davis et al. | 361/18 |
| 5,010,293 | * | 4/1991 | Ellersick | 323/908 |
| 5,343,141 | * | 8/1994 | Metro et al. | 323/908 |
| 5,637,992 | * | 6/1997 | Edwards | 323/280 |
| 5,822,203 | * | 10/1998 | Peron | 323/908 |
| 5,986,484 | * | 11/1999 | Kimata | 323/908 |
| 6,160,387 | * | 12/2000 | Moraghan | 323/277 |

* cited by examiner

*Primary Examiner*—Jeffrey Sterrett
(74) *Attorney, Agent, or Firm*—H. C. Lin, Patent Agent

(57) ABSTRACT

During transient operation of a voltage regulator, the gate of p-channel MOS pass transistor may be pulled down during the transient period to cause excessive surge current. The surge current is limited by using the pass transistor as a current mirror during the transient period. After the transient period, the pass transistor resumes its role as an element together with a differential amplifier and a reference voltage in a feedback loop to regulate the output voltage.

6 Claims, 1 Drawing Sheet

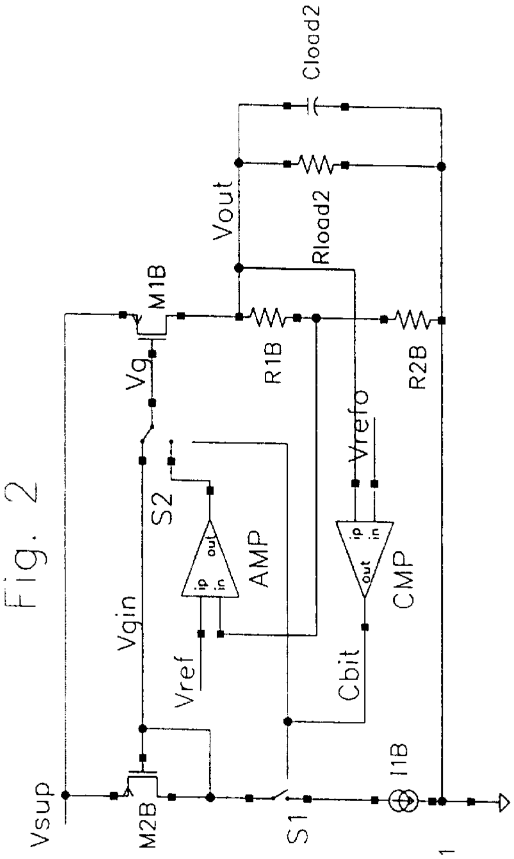
Fig. 2
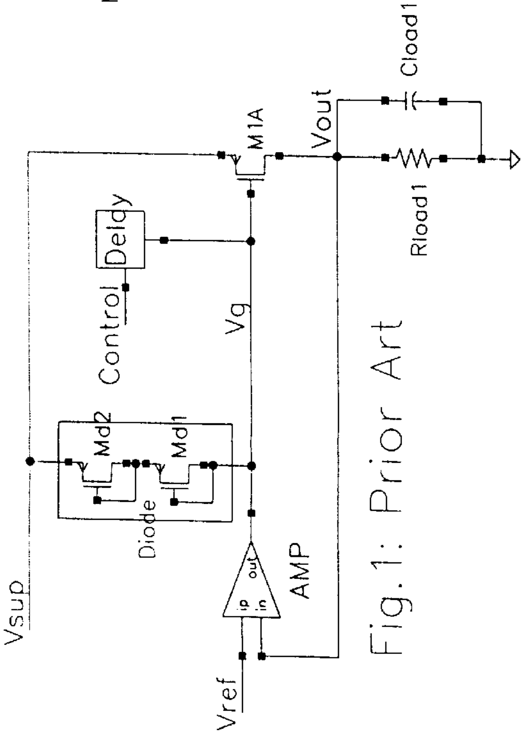
Fig.1: Prior Art
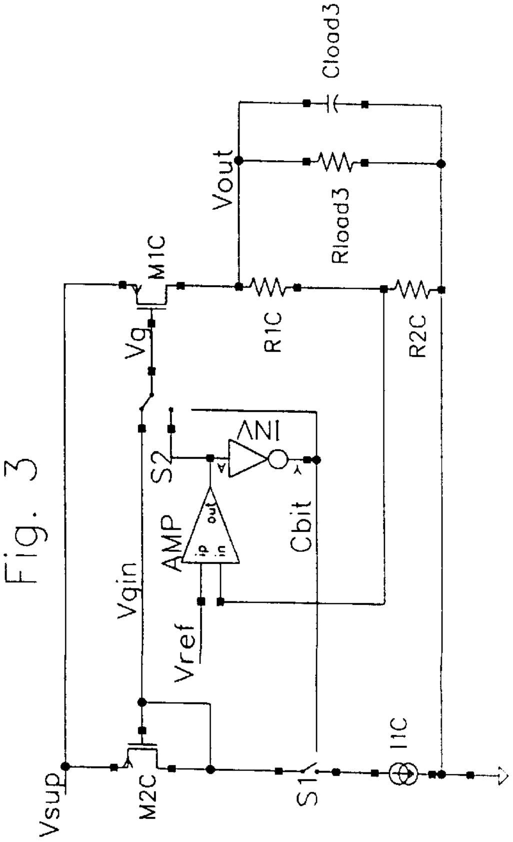
Fig. 3

TRANSIENT CURRENT AND VOLTAGE PROTECTION OF A VOLTAGE REGULATOR

BACKGROUND OF THE INVENTION (1) Field of the Invention

This invention relates to protection of output devices, particularly to the output device of a voltage regulator, and output driver amplifier.

(2) Brief Description of the Related Art

Large output devices are commonly found in voltage regulator, output driver amplifier etc. Large surge current are produced especially during power supply powering up, as well as by power up/down control bit.

In a widely used regulated power supply as shown in FIG. 1, this surge current is particularly severe. In this operation, an unregulated supply voltage Vsup is applied through a p-channel MOS pass transistor M1A to a load Rload in parallel with a load capacitor Cload with a regulated output voltage Vout. The output voltage or a fraction of the output voltage is compared with a reference voltage Vref in a differential amplifier AMP. The output voltage of the differential amplifier Vg is used to control the gate of the pass transistor M1A until the regulated output voltage Vout is equal to the reference Vref. For proper operation, the output voltage Vout is applied to the inverting input of the differential amplifier AMP and the reference voltage Vref is applied to the non-inverting input of the differential amplifier AMP.

During the time when the power supply is suddenly applied (ramps up), the reference voltages appears at the non-inverting input of AMP before Vout appears at the inverting input of AMP due to the load capacitor. Thus, the gate voltage Vg of M1A is pulled down to cause a heavy current to flow in M1A. Such a surge current may damage the transistor.

The first prior art to reduce the surge current is to use diodes to clamp the gate voltage (FIG. 1, node Vg). The two pMOS transistors Md1 and Md2 are connected as diodes to clamp Vg to approxinately two threshold voltages below the supply voltage Vsup. However, it is difficult to obtain effective diode clamp that has the right trigger voltage and low leakage current during off state.

The second prior art is to control the node Vg change slowly during transient events as shown in FIG. 1. The Delay block generates a very slow delay ramp signal to slowly turn on the gate node Vg of the M1A, so as to try to reduce the large transient current. The result is not satisfactory due to the large output device current produced in response to small voltage change in Vg. Also, a too slow or weak control of the Vg conflicts with the control by the AMP amplifier.

SUMMARY OF THE INVENTION

An object of this invention is to precisely control the surge current of the large output device during transient operations. Another object of this invention is to prevent damage to an output transistor or an integrated circuit of a regulated power supply.

These objects are achieved by limiting the current through the pass transistor during the transient period. After an output voltage has been derived at the output voltage with the limited current through the pass transistor, the circuit begins to function as a regulated power supply

BRIEF DESCRIPTION OF THE SEVERAL VIEWS OF THE DRAWINGS

FIG. 1 shows a prior art regulated power supply.

FIG. 2 shows a first embodiment of the present invention.

FIG. 3 shows a second embodiment of the present invention.

DETAILED DESCRIPTION OF THE INVENTION

The basic principle of this present invention is to limit the current through the pass transistor in voltage regulator during the transient operation. After an output voltage has been derived, the regulator begins to function as a regulated power supply.

FIG. 2 shows a first embodiment of the present invention. In this circuit, the pass transistor M1B has a source connected to a supply voltage Vsup, and a drain connected to a Rload1 in parallel with a load capacitance Cload1. When the regulator is first turned on by closing the switch S1, current from a current source I1B flows through the pMOS connected as a MOS diode and develops a gate voltage Vgin. Meanwhile the the single-pole-double-throw switch S2 connects the gate of M1B to the gate M2B. Thus, M1B is a current mirror of M2B and mirrors the current I1B to flow through M2B and charges the load capacitance Cload0 to develop an output Vout across the series resistors R1B and R2B. Thus, the present invention controls the surge current through the pass transistor M1B during the transient instant by current mirror, such that the output device current is precisely controlled and deterministic.

Since the output device (M1B) is a current source, it charges the load capacitor Cload at the output node to Vsup, and may damage the CMOS circuit if the current sustains. Thus, a voltage comparator is needed to detect, and switch the current mirror device off, and to put the output device back into closed loop voltage feedback control so the Vout voltage is now precisely control by Vref. This is accomplished by sensing Vout to compare with a reference voltage Vrefo in a comparator CMP. During a transient event (e.g. power supply ramping up, or power up/down control bit), the large output device M1B is switched to be the current mirror of device M2B. Thus the output current is precisely a multiplied value of M2B current, and there is no surge current. The output voltage Vout thus ramps up. A comparator CMP monitors the output voltage Vout, such that when it reaches a reference value of Vrefo, it output a control bit Cbit which is used to control the SPDT switch S1 and switches the output device M1B back to the amplifier AMP voltage feedback control.

When the switch S1 is switched to connect the output of a differential amplifier AMP, the output of the differential amplifier becomes the gate voltage Vg for M1B. A fraction of the output voltage Vout derived from the voltage divider R1B and R2B is fed to the inverting input of the differential amplifier AMP, and a reference voltage Vref is applied to the non-inverting input of AMP. With this connection, a negative feedback loop is formed and the output voltage is regulated by the reference voltage Vref as is well known. The output voltage Vout is precisely controlled by this voltage feedback loop and determined by Vout=Vref*(R1B+R2B)/R2B. Note that the output device M1B is initially in current controlled mode, and subsequently in voltage controlled mode.

Additional innovation is that both the comparator and linear operational amplifier can be merged into a single circuit block as shown in FIG. 3. The amplifier AMP in FIG. 2 is not used during the output device in current controlled mode, and that the amplifier AMP in opened loop mode is functionally equivalent to a voltage comparator. As in FIG.2, when the power switch S1 is turned on, the current I1C flows through the diode connected pMOS M2C and develops a gate voltage Vgin to mirror the current I1C to flow in the pass transistor M1C. When the mirrored current of M1C charges up the load capacitor Cload1 to develop an output voltage Vout. A fraction of Vout from the voltage divider R1C, R2C is connected to the inverting input of a differential amplifier AMP. A reference voltage Vref is connected to the non-inverting input of the differential amplifier. The differential amplifier AMP now functions as a comparator and outputs a voltage to feed an inverter INV. The output of inverter INV is Cbit which is used to control the SPDT switch S2. After S2 is switched to connect the output of the AMP as Vg for the pass transistor M1C, a feedback loop to formed to regulate the output voltage Vout to be a multiplied voltage of the reference voltage as is well-known in the art. Thus, as shown in FIG. 3, the AMP circuit block merges both functionalities and is utilized as a comparator initially in the current controlled mode, and later as a linear voltage amplifier in the voltage controlled mode.

While the foregoing descriptions deal with MOSFETs, it should be pointed out the same techniques are applicable to bipolar transistors.

While the preferred embodiments have been described, it will be apparent to those skilled in the art that various variations may be made in the embodiments without departing from the spirit of the present invention. Such modifications are all within the scope of this invention.

What is claimed is:

1. A current protection circuit, comprising:

a power supply;

a load having a resistance in parallel with a capacitance;

an output transistor used as the pass transistor of a voltage regulator between said power supply and said load, said voltage regulator having:

an output voltage developed across said load, a current source for charging the load during a transient period before the output voltage reaches a predetermined value; and a differential amplifier which compares the output voltage with a first reference voltage and develops controls for the controlling electrode of the output transistor to form a feedback loop for regulating said output voltage after the output voltage reaches said predetermined value and to switch off said current source.

2. A current surge protection circuit as described in claim 1, wherein said current source is a current mirror.

3. A current surge protection circuit as described in claim 1, wherein said pass transistor serves as a current source during said transient period.

4. A current surge protection circuit as described in claim 1, wherein said output transistor is a MOSFET.

5. A current surge protection circuit as described in claim 4, wherein said MOSFET has a p-channel.

6. A current surge protection circuit as described in claim 4, wherein said current mirror is made of p-channel MOSFETs.

* * * * *